United States Patent
Hardegger et al.

[15] 3,694,428
[45] Sept. 26, 1972

[54] STREPTOZOTOCIN AND DERIVATIVES

[72] Inventors: Emil Hardegger, 15 Tennried, Gockhausen, Switzerland; Arthur Josef Johann Meier, 3 Amwell Lane, St. Margarets, Stanstead Abbots, Ware, England

[22] Filed: March 5, 1970

[21] Appl. No.: 16,941

[30] Foreign Application Priority Data

March 7, 1969 Switzerland...............3502/69

[52] U.S. Cl.................260/211 R, 260/349, 260/999
[51] Int. Cl..............................................C07c 95/04
[58] Field of Search...................................260/211 R

[56] References Cited

UNITED STATES PATENTS

| | | | |
|---|---|---|---|
| 2,993,887 | 7/1961 | Zech | 260/211 R |
| 3,577,406 | 5/1971 | Hessler | 260/211 R |

*Primary Examiner*—Lewis Gotts
*Assistant Examiner*—Johnnie R. Brown
*Attorney*—Samuel L. Welt, Jon S. Saxe, Bernard S. Leon, Gerald S. Rosen and R. Hain Swope

[57] ABSTRACT

Methods of producing streptozotocin and novel derivatives thereof by reacting an N-nitroso-alkylcarbamyl azide with D-glucosamine or an acid addition salt thereof are disclosed. Novel intermediates which are useful in the process are also disclosed. Streptozotocin and its novel derivatives are useful as diabetogenetic compounds.

8 Claims, No Drawings

STREPTOZOTOCIN AND DERIVATIVES

BACKGROUND OF THE INVENTION

Streptozotocin [2-deoxy-2-(3-methyl-3-nitroso-ureido)-D-glucose] is a known antibiotic and antimitotic compound having diabetogenetic activity. The compound can be produced by isolation from *Streptomyces achromogenes* fermentation broth, however, the yields of product from the process is very low and the products themselves are impure.

DESCRIPTION OF THE INVENTION

Compounds represented by the formula

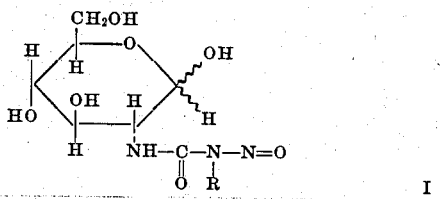

I wherein R is lower alkyl,
are produced by reacting D-glucosamine or an acid addition salt thereof with a compound represented by the formula

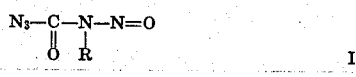

II wherein R is lower alkyl.

As used herein, "lower alkyl" includes straight chain or branched chain alkyl groups containing from one to six carbon atoms inclusive, e.g., methyl, ethyl, propyl, isopropyl, butyl, tertiary butyl and the like.

Of the compounds produced by the process of this invention, those represented by the following formula

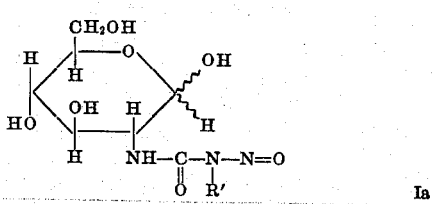

Ia wherein R' represents an alkyl group of from two to six carbon atoms inclusive
are novel. The intermediates useful in the process of this invention are novel and are represented by formula II. D-glucosamine, a known compound, can be utilized in the form of an acid addition salt, preferably a mineral acid addition salt, e.g., the hydrochloride salt. The acid addition salts of D-glucosamine are converted to D-glucosamine in situ while the process of this invention is being carried out.

The N-nitroso-alkylcarbamyl azides represented by formula II are prepared by reacting an alkylcarbamyl azide with a nitrosating agent. Typical suitable nitrosating agents are nitrosyl halides. Preferred for use in this reaction is nitrosyl chloride.

The nitrosation reaction is expediently carried out in the presence of an organic base, e.g., pyridine, in a solvent, preferably acetic acid anhydride. The reaction temperature can vary between about −20° C. and room temperature (20°–25° C.), however, the preferred range is between about 0° and about +10° C. The novel N-nitroso-alkylcarbamyl azide products can be isolated but they are unstable and have a tendency to decompose explosively. Therefore, the azides are preferably extracted from the cold reaction solution, mixed with ice-water, with an inert solvent, preferably ether. In this form the compounds can advantageously be utilized in the process of this invention.

The alkylcarbamyl azides used to produce the N-nitroso-alkylcarbamyl azides are produced by known processes by either reacting an alkyl isocyanate with hydrazoic acid or by reacting an alkylcarbamyl chloride with sodium azide.

The reaction of D-glucosamine with the N-nitroso-alkylcarbamyl azides produced as described above is accomplished by diluting a solution of the N-nitroso-alkylcarbamyl azide, preferably an ethereal solution, with an inert solvent, e.g., dimethylformamide, pyridine, picoline or quinoline, preferably pyridine, removing the ether under reduced pressure and then reacting the remaining solution of the azide in the inert solvent with a suspension of D-glucosamine in one of the same inert solvents, preferably in pyridine, with stirring in the cold. The reaction temperature can vary between about −20° C. and about +40° C., but preferably it is kept cold, e.g., about 0° C. The product can be separated from the resulting clear solution either by evaporation under a high vacuum at about 0° C. to about 5° C. or by dilution with ether. The resulting solid is then washed with ether and the resulting insoluble residue is then partially dissolved in ethanol and purified by adsorption on silica gel (eluant: chloroform/ethanol 1:1 to 2:1). The compounds of formula Ia obtained in this manner wherein R' is ether ethyl, propyl or butyl which melt with decomposition between about 100° C. and 130° C. can all be recrystallized from ethanol.

If an acid addition salt of D-glucosamine, e.g., D-glucosamine hydrochloride, is used as a reactant, it is dissolved in an inert solvent, e.g., pyridine, and reacted with potassium tert.-butylate. The resulting solution is then reacted with the N-nitroso-alkylcarbamyl azide corresponding to the desired final product without isolating the D-glucosamine contained therein.

If N-nitroso-methylcarbamyl azide is reacted as described hereinbefore with D-glucosamine, 2-deoxy-2-(3-methyl-3-nitroso-ureido)-D-glucose (streptozotocin) is obtained. Streptozotocin, a known compound, melts at 106° C. with decomposition.

The compounds represented by formula I resulting from the process of this invention have diabetogenic properties. The antibiotic and antimitotic streptozotocin has the highest specific diabetogenic activity. This is manifested by tests in rats and dogs, which show that the compounds represented by formula I inhibit the granulation of the β-cells in the islets of Langerhans, thus irreversibly inhibiting insulin production. Since the activity of hypoglycemic compounds, i.e., those with anti-diabetic activity is manifested only on tests with diabetic animals rather than normal animals, diabetic or prediabetic animals are ideal test objects. Therefore, the compounds produced by the process of this invention are useful for producing diabetes in test animals which are then subsequently utilized to test potential hypoglycemic compounds.

The following examples illustrate the invention. Temperatures are in ° C.

EXAMPLE 1

(a) 35.2 Gm. (617 mmol) of methyl isocyanate are reacted in 250 ml. of carbon tetrachloride with dry hydrogen chloride gas at a temperature not exceeding +5°. After the reaction stops, the reaction mixture is stirred for 1 hour with hydrogen chloride gassing, then purged with nitrogen for 1 additional hour, then cooled to −20°. The resulting precipitate, methylcarbamyl chloride, is filtered off, washed with cold hexane and recrystallized from hexane/ether. The resulting colorless crude methylcarbamyl chloride melts at 90°.

935 Mg. (10 mmol) of crude methylcarbamyl chloride in 10 ml. of acetone are treated with stirring at 4° for 3 hours with 700 mg. of sodium azide activated with hydrazine. The reaction mixture is then shaken with ice-water and ether. The ether phase is separated off, dried and evaporated at room temperature (20°–25°) under reduced pressure. After recrystallization from ether/hexane, the resulting product, methylcarbamyl azide, melts at 48°–48.5°.

40 Ml. of pyridine are added to 3 gm. (30 mmol) of methylcarbamyl azide, then 10 ml. of a 4.1 N nitrosyl chloride solution in acetic acid anhydride are added dropwise at a reaction temperature not exceeding +10°. After the addition is completed, the reaction mixture is stirred for 10 minutes more at 0°, then poured onto ice and taken up in ether. The ether phase is successively shaken, in each case with the addition of ice, with 2 N hydrochloric acid, 1 N potassium carbonate solution and a saturated sodium chloride solution. It is then dried over magnesium sulfate.

The ethereal solution of N-nitroso-methylcarbamyl azide obtained in this manner is stable in the cold. If the azide is isolated from the ether solution, it would decompose spontaneously with explosive force. The non-explosive ethereal solution of N-nitroso-methylcarbamyl azide is therefore employed for the reaction with D-glucosamine.

(b) 10 Ml. of pyridine are added to 1.3 gm. (10 mmol) of N-nitroso-methylcarbamyl azide in ether. The ether is cautiously distilled off under reduced pressure at room temperature (20°–25°) and the mixture of N-nitroso-methylcarbamyl azide and pyridine is then stirred into a suspension of 900 mg. (5 mmol) of D-glucosamine in 50 ml. of pyridine at 0°. The resulting clear solution is then poured into 500 ml. of ether. The yellowish product which separates out in the course of 1 hour is isolated, washed with 300 ml. of ether and dissolved in 50 ml. of absolute ethanol at 20°. The resulting solution is filtered through 70 gm. of silica gel. The product, crude streptozotocin, is then eluted from a new column of 70 gm. of silica gel with chloroform/absolute ethanol 1:1. The resulting pure, slightly yellowish-colored streptozotocin which is isolated from the eluate by evaporation melts at ca 106° with decomposition.

EXAMPLE 2

The procedure of Example 1 is followed but the D-glucosamine is replaced with a D-glucosamine solution prepared from D-glucosamine hydrochloride, pyridine, potassium tert. butylate and tert. butyl alcohol as follows: Finely ground D-glucosamine hydrochloride (862 mg.) is suspended in 80 ml. of pyridine and, after addition of 4 ml. of a 1 N solution of potassium tert. butylate in tert. butyl alcohol, is shaken at room temperature for 90 minutes. The D-glucosamine solution thus obtained is treated with an ethereal solution of ca 774 mg. of N-nitroso-methylcarbamyl azide, stirred at room temperature for 20 minutes and then worked up as described in Example 1. The lightly yellow-colored streptozotocin obtained melts at 104°–106° (with decomposition).

EXAMPLE 3

Following the procedures of Examples 1 and 2, 2-deoxy-2-(3-ethyl-3-nitroso-ureido)-D-glucose (ethylstreptozotocin) m.p. ca 128°;

$$\alpha_D^{25} = +70°$$

(abs. ethanol c = 1) is produced from N-nitroso-ethylcarbamyl azide and D-glucosamine; 2-deoxy-2-(3-propyl-3-nitroso-ureido)-D-glucose (propylstreptozotocin) m.p. ca 127°;

$$\alpha_D^{25} = +65°$$

(abs. ethanol c = 1.5) is produced from N-nitroso-propylcarbamyl azide and D-glucosamine; and 2-deoxy-2-(3-butyl-3-nitroso-ureido)-D-glucose (butylstreptozotocin) m.p. ca 124°;

$$\alpha_D^{25} = +61°$$

(abs. ethanol c = 1) is produced from N-nitroso-butylcarbamyl azide and D-glucosamine.

N-nitroso-ethylcarbamyl azide utilized to produce ethylstreptozotocin is produced as follows:

21.3 Gm. (0.3 mol) of ethyl isocyanate are reacted in 100 ml. of carbon tetrachloride with dry hydrogen chloride. The gas-stream is so regulated that the temperature of the reaction mixture remains between 0° and 14°. After cessation of the reaction, the mixture is stirred at −20° with hydrogen chloride gassing for a further 30 minutes and subsequently, at room temperature, evaporated at reduced pressure and then dried in high vacuum. The residual crude liquid ethyl carbamyl chloride is then reacted as follows:

21.5 Gm. (0.2 mol) of crude ethylcarbamyl chloride in 200 ml. of acetone are reacted with 17.3 gm. of sodium azide (33 percent excess) activated with hydrazine and stirred at 4° for 3 hours. The resulting colorless solution is then separated from the resulting colorless precipitate. The precipitate is then rinsed with ether and the colorless solution is partitioned between ether and ice-water. The ether phase is separated off, combined with the wash ether, then dried and evaporated at room temperature. The resulting residue of crude ethylcarbamyl azide is purified by distillation. The product, a pure colorless compound, boils at ca 90°−100°/mm. Hg. and, after recrystallization from ether/hexane, melts at 17°–17.5°.

72 Ml. of pyridine are added to 3.42 gm. (30 mmol) of ethylcarbamyl azine and 10 ml. of a 4.76 N nitrosyl chloride solution in acetic acid anhydride are added to the mixture dropwise with stirring at a temperature not exceeding +5°. The reaction mixture is then stirred at 0° for 10 more minutes, poured onto ice and taken up in ether. The ether phase is successively shaken, in each case with the addition of ice, with 2 N hydrochloric acid, 1 N potassium carbonate solution and a saturated sodium chloride solution. It is then dried over magnesium sulfate. The resulting ethereal solution of N-nitroso-ethylcarbamyl azide is suitable for reacting with D-glucosamine according to the procedure of Example 1 or with an acid addition salt of D-glucosamine according to the procedure of Example 2.

Using the preceding method but starting with propyl isocyanate, N-nitroso-propylcarbamyl azide is produced. The propyl isocyanate is converted to propylcarbamyl chloride which is then converted to propylcarbamyl azide (b.p. 55°–60°/1 mm. Hg., m.p. −1° to 0°) which is subsequently converted to N-nitroso-propylcarbamyl azide. Using the corresponding butyl compounds results in the production of butyl carbamyl azide (b.p. 44°–55°/1 mm. Hg., m.p. 17°–17.5°) which is subsequently converted to N-nitroso-butylcarbamyl azide.

We claim:

1. A process for the production of nitrosourea compounds represented by the formula

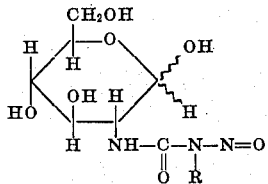

wherein R represents lower alkyl, comprising reacting D-glucosamine or an acid addition salt thereof with a compound represented by the formula

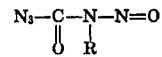

wherein R has the foregoing significance.

2. Process according to claim 1 wherein the reaction is carried out in an inert solvent.

3. Process according to claim 1 wherein the reaction temperature is from about −20° C. to about +40° C.

4. Process according to claim 1 wherein the reactants are D-glucosamine and N-nitroso-methylcarbamyl azide.

5. Process according to claim 1 wherein the reactants are D-glucosamine hydrochloride and N-nitroso-methylcarbamyl azide.

6. Process according to claim 1 wherein the reactants are D-glucosamine and N-nitroso-ethylcarbamyl azide.

7. Process according to claim 1 wherein the reactants are D-glucosamine and N-nitroso-propylcarbamyl azide.

8. Process according to claim 1 wherein the reactants are D-glucosamine and N-nitroso-butylcarbamyl azide.

* * * * *

UNITED STATES PATENT OFFICE
CERTIFICATE OF CORRECTION

Patent No. 3,694,428                                Dated September 26, 1972

Inventor(s) Hardegger et al.

It is certified that error appears in the above-identified patent and that said Letters Patent are hereby corrected as shown below:

Cover page, Column 1, line following "[72] Inventors: " insert

[73] Assignee:  Hoffmann-La Roche Inc., Nutley, N.J.

Signed and sealed this 3rd day of April 1973.

(SEAL)
Attest:

EDWARD M. FLETCHER, JR.                      ROBERT GOTTSCHALK
Attesting Officer                                 Commissioner of Patents